United States Patent
Lejon et al.

(10) Patent No.: US 10,436,237 B2
(45) Date of Patent: Oct. 8, 2019

(54) FASTENER

(71) Applicant: Bulten AB, Göteborg (SE)

(72) Inventors: Philip Lejon, Göteborg (SE); Fredrik Lundin, Göteborg (SE); Thomas Nordlund, Göteborg (SE)

(73) Assignee: BULTEN AB, Gothenburg (SE)

( * ) Notice: Subject to any disclaimer, the term of this patent is extended or adjusted under 35 U.S.C. 154(b) by 130 days.

(21) Appl. No.: 15/542,620

(22) PCT Filed: Jan. 22, 2016

(86) PCT No.: PCT/EP2016/051337
§ 371 (c)(1),
(2) Date: Jul. 10, 2017

(87) PCT Pub. No.: WO2016/116597
PCT Pub. Date: Jul. 28, 2016

(65) Prior Publication Data
US 2018/0266474 A1 Sep. 20, 2018

(30) Foreign Application Priority Data

Jan. 23, 2015 (EP) .................................... 15152260

(51) Int. Cl.
*F16B 35/04* (2006.01)
*B29C 45/14* (2006.01)
(Continued)

(52) U.S. Cl.
CPC ...... *F16B 35/045* (2013.01); *B29C 45/14336* (2013.01); *F16B 25/0094* (2013.01);
(Continued)

(58) Field of Classification Search
CPC .... F16B 35/044; F16B 35/045; F16B 35/047; F16B 21/08
(Continued)

(56) References Cited

U.S. PATENT DOCUMENTS 1,394,608 A * 10/1921 Davern ................. F16B 35/044
29/271
3,137,195 A 6/1964 Rosenberg, Jr.
(Continued)

FOREIGN PATENT DOCUMENTS

DE 19647589 C1 2/1998
DE 102010041165 A1 3/2012
(Continued)

OTHER PUBLICATIONS

International Search report corresponding to PCT/EP2016/051337, dated Nov. 4, 2016.
(Continued)

*Primary Examiner* — Flemming Saether
(74) *Attorney, Agent, or Firm* — Sandberg Phoenix & von Gontard PC

(57) ABSTRACT

The present invention relates to a fastener (10) for a non-threaded bore (50), which fastener comprises: a first member (12) with a head (18), an externally threaded shank (20) extending from the head, and an axially extending projection (22) at the opposite end (24) of the shank compared to the head; and a second at least partly deformable member (14) attached to the axially extending projection, wherein the second member comprises a plurality of longitudinally extending outer ridges (40a-d). The present invention also relates to a method of mounting a first object (46) to a second object (48) using such a fastener, and to a method of manufacturing a fastener (10).

23 Claims, 5 Drawing Sheets

(51) Int. Cl.
 *F16B 25/00* (2006.01)
 *F16B 41/00* (2006.01)
 *B29L 1/00* (2006.01)
(52) U.S. Cl.
 CPC .. *F16B 41/002* (2013.01); *B29C 2045/14934* (2013.01); *B29L 2001/007* (2013.01)
(58) Field of Classification Search
 USPC ............................. 411/386, 383, 452, 451.4
 See application file for complete search history.

(56) References Cited

U.S. PATENT DOCUMENTS

| | | | | |
|---|---|---|---|---|
| 3,439,575 A | * | 4/1969 | Gifford | F16B 35/047 411/386 |
| 3,501,993 A | * | 3/1970 | Swenson | F16B 35/005 411/393 |
| 4,810,145 A | | 3/1989 | Villas | |
| 5,547,324 A | * | 8/1996 | Durr | A61C 8/005 411/304 |
| 5,967,725 A | * | 10/1999 | Voges | F16B 35/00 411/302 |
| 6,685,410 B1 | * | 2/2004 | Allen | F16B 19/05 411/361 |
| 7,530,775 B2 | * | 5/2009 | Jaconelli | B60R 21/213 411/302 |
| 7,950,887 B2 | * | 5/2011 | Dietz | F16B 25/0021 411/301 |
| 8,632,105 B2 | * | 1/2014 | Krueger | F16B 35/041 24/279 |
| 2008/0159826 A1 | | 7/2008 | Dietz et al. | |

FOREIGN PATENT DOCUMENTS

| | | |
|---|---|---|
| EP | 0049218 A2 | 4/1982 |
| EP | 1645370 A1 | 4/2006 |
| GB | 2400154 A | 10/2004 |
| JP | H09177747 A | 7/1997 |

OTHER PUBLICATIONS

Written Opinion corresponding to PCT/EP2016/051337, dated Nov. 4, 2016.
Article 94(3) Communication corresponding to EP15152260.4, dated Apr. 8, 2015.
Extended European Search Report corresponding to EP15152260.4, dated Jul. 15, 2016.

* cited by examiner

FASTENER

CROSS-REFERENCE TO RELATED APPLICATIONS

This application is the US National Stage under 35 U.S.C. § 371 of International App. No. PCT/EP2016/051337 filed on Jan. 22, 2016, and which claims priority to European App. No. 15152260.4 filed on Jan. 23, 2015, all of which are incorporated herein by reference.

FIELD OF THE INVENTION

The present invention relates to a fastener for a bore, which fastener comprises first member and a second member. The present invention also relates to a method of mounting a first object to a second object using such a fastener, and to a method of manufacturing a fastener.

BACKGROUND OF THE INVENTION

A fastener comprising a first member and a second member is disclosed in GB2400154 A. Specifically, GB2400154 A discloses a fastening which may be useful in securing in position, within a vehicle, an air-bag of the "inflatable curtain" type. The fastening comprises a bolt. The bolt has a head and a threaded shank extending from the head. The threaded shank is dimensioned to co-operate with a predetermined threaded bore and the free end of the shank remote from the head is provided with an end cap. The end cap has a yieldable formation to engage frictionally with the threaded bore. The shank of the bolt is provided with an axially extending projection having an enlarged head, and the cap has an internal bore dimensioned to receive the projection and head. The end cap is provided with a plurality of radially outwardly extending segmented flanges. A ridge extends axially passing between adjacent flange sections. When fastenings disclosed in GB2400154 A are used to secure an inflatable curtain in position, each fastening may be passed through an aperture formed in a lug provided on the inflatable curtain so that the end cap becomes frictionally engaged within the threaded bore which is provided to received the appropriate bolt. When all of the fastenings have been inserted in position in this way, the frictional grip effected by the fastenings to the threaded bores provided in the motor vehicle will be sufficient to hold the inflatable curtain in position. By applying further axial pressure, the threaded shank of the bolt of a fastening may then be brought into engagement with the threaded aperture and the bolt may be fastening in the conventional manner.

GENERAL DISCLOSURE OF THE INVENTION

It is a general object of the present invention to provide an improved fastener. Furthermore, it may be desirable to use a "two-member" fastener with a non-threaded bore. It is hence a particular object of the present invention to provide a "two-member" fastener useable for a non-threaded bore.

According to a first aspect of the invention, these and other objects are achieved by a fastener for a non-threaded bore, which fastener comprises: a first member with a head, an externally threaded shank extending from the head, and an axially extending projection at the opposite end of the shank compared to the head; and a second at least partly deformable member attached to the axially extending projection, which second member comprises a plurality of longitudinally extending outer ridges.

The longitudinally extending outer ridges are situated in the direction of, or along, the longitudinal axis of the fastener. The longitudinally extending outer ridges of the second member make the present fastener useable for a non-threaded bore. In particular, the longitudinally extending outer ridges may provide for an appropriate contact surface with the non-threaded bore. The ridges may be dimensioned so that the contact surface is large enough for the second member of the fastener to be press-fitted in the non-threaded bore, and at the same time small enough not to cause too much friction, whereby the second member easily can be inserted into the non-threaded bore. Furthermore, manufacturing of the second member with the longitudinally extending outer ridges may be facilitated.

The longitudinally extending outer ridges of the second member are separated by longitudinally unvarying surfaces. 'Longitudinally unvarying' means that the surfaces may be even or smooth throughout the length of the second member. The longitudinally unvarying surfaces between the ridges may provide sufficient space for the ridges to be deformed in the non-threaded bore.

The second member may comprise a cylindrical outer surface including the longitudinally extending outer ridges. Portions or sections of the cylindrical outer surface between the ridges may form the aforementioned longitudinally unvarying surfaces.

Each longitudinally extending outer ridge may have a trapezoid cross-section, wherein the cross-section is perpendicular to the longitudinal axis of the fastener.

Each longitudinally extending outer ridge may extend uniformly along substantially the complete length of the second member. This may allow the second member (and hence the fastener) to be stably positioned in the non-threaded bore.

The longitudinally extending outer ridges may be evenly distributed about the circumference of the second member. This may allow forces to be evenly distributed when the second member is press-fitted in the non-threaded bore.

The second member may be molded onto the axially extending projection of the first member.

The opposite end of the shank of the first member may be circular and chamfered. This may facilitate molding the second member onto the axially extending projection of the first member.

The first member may be self-tapping.

The maximum diameter of the second member may be equal to or less than the maximum diameter of the externally threaded shank of the first member.

The first member can be made of metal or alloy, and the second member can be made of plastics.

According to a second aspect of the invention, there is provided a method of mounting a first object to a second object having a non-threaded bore using a fastener according to the first aspect, which method comprises: inserting the second member of the fastener into the non-threaded bore; and subsequently screwing the first member of said fastener into the non-threaded bore. This aspect may exhibit the same or similar features and technical effect as the first aspect of the invention, and vice versa. The method may further comprise: before inserting the second member of the fastener into the non-threaded bore, passing the second member through an aperture of the first object.

According to a third aspect of the invention, there is provided a method of manufacturing a fastener, which method comprises: providing (e.g. manufacturing) a first member of the fastener, the first member comprising a head, an externally threaded shank extending from the head, and an axially extending projection at the opposite end of the shank compared to the head; and molding a second member onto the axially extending projection of the first member, which second member is adapted to be press-fitted in a non-threaded bore. This aspect may exhibit the same or similar features and technical effect as the first and second aspects of the invention, and vice versa. For example, the second member may be at least partly deformable and comprise a plurality of longitudinally extending outer ridges. Molding the second member onto the axially extending projection of the first member may comprise: sealing a casting mold against the aforementioned circular and chamfered opposite end of the shank of the first member; and injecting mold material into the casting mold to form the second member of the fastener.

BRIEF DESCRIPTION OF THE DRAWINGS

The present invention will be described in more detail with reference to the appended drawings, showing a currently preferred embodiment of the invention.

DETAILED DESCRIPTION OF PREFERRED EMBODIMENTS

Figure 1:
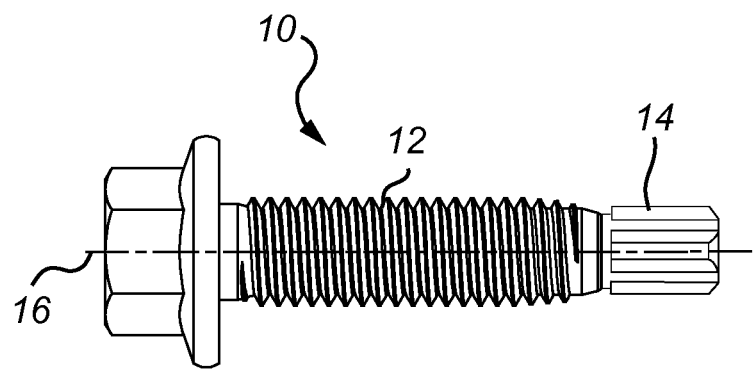
FIG. 1 is a schematic side view of a fastener according to an embodiment of the present invention.
Figure 1A:
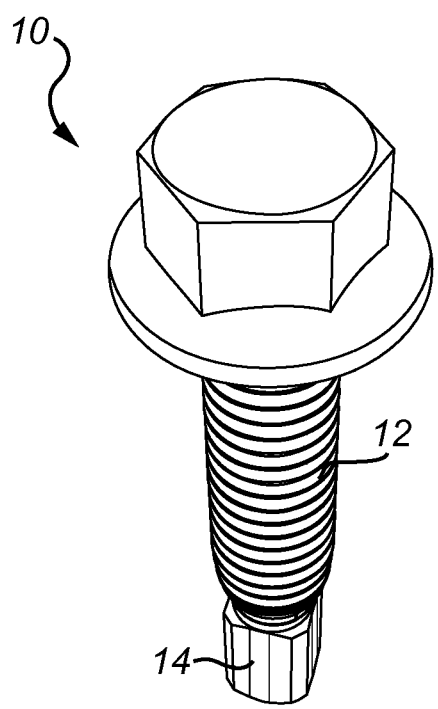
FIG. 1a is a schematic perspective view of the fastener of FIG. 1.

FIGS. 1 and 1a show a fastener 10 for a non-threaded bore according to an embodiment of the present invention. The fastener 10 comprises a first member 12, a second member 14, and a longitudinal axis 16. The longitudinal axis 16 passes centrally through the fastener 10 from head to tip. The first member 12 may for example be a screw member or a bolt member. The second member 14 may be referred to as an end cap or a clip.

Figure 2:
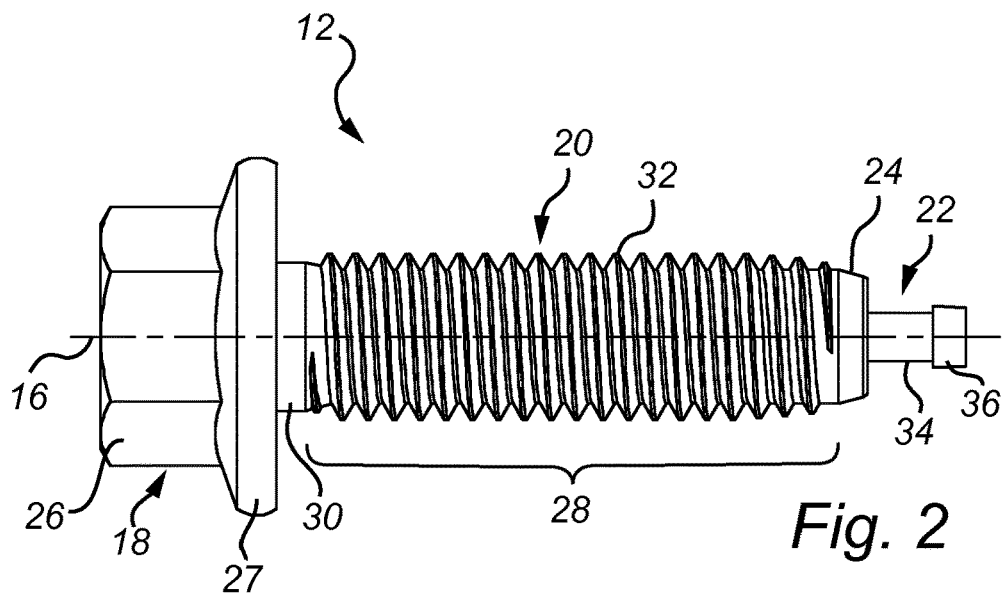
FIG. 2 is a side view of a first member of the fastener of FIG. 1.

Turning to FIG. 2, the first member 12 comprises a head 18, a shank 20 extending from the head 18, and a projection 22 co-axially extending from end 24 of the shank 20.

The head 18 comprises a tool interface 26, here an external hex. However, the head 18 may have other tool interfaces, such as internal hex, slot, philips, etc. The head 18 also comprises an enlarged flange 27.

The shank 20 comprises a threaded portion 28, and a (short) non-threaded portion 30 next to the head 18. Alternatively, the threaded portion 28 can extend all the way to the head 18. The threaded portion 28 here comprises a single, external thread 32. The first member 12 of the fastener 10 is self-tapping. The threaded portion 28 of the shank 20 may for example be of the type TAPTITE II with a TRILOBULAR shape provided by Research Engineering & Manufacturing Inc. The end 24 of the shank 20 is non-threaded, circular, and chamfered, with its diameter decreasing towards the projection 22. In other words, the end 24 has the shape of a truncated cone.

The projection 22 generally has a smaller diameter than the shank 20. The projection 22 may for example comprise a cylinder 34 which terminates with an anchor portion 36.

The head 18, the shank 20, and the projection 22 of the first member 12 are preferably made in one piece. The first member 12 may for example be made of metal or alloy, such as steel. The first member 12 may for example have an overall length of about 26.6 mm, and the diameter of the shank 20 may be about 5 mm, with a maximum diameter of 5.09 mm.

Figure 3:
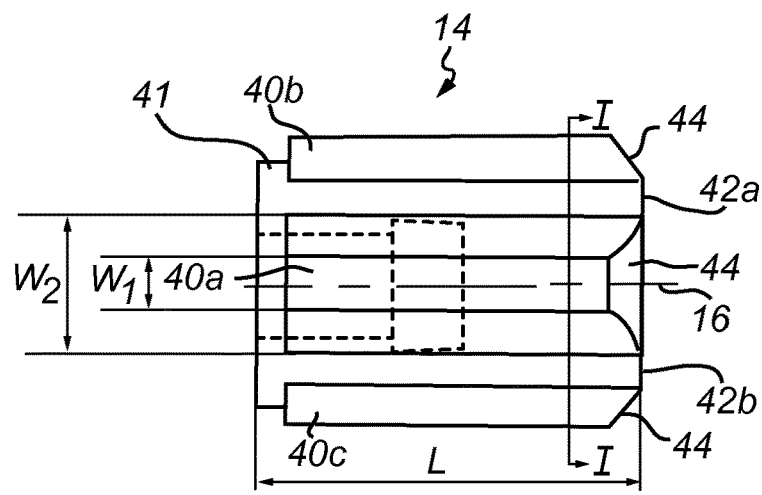
FIG. 3 is a side view of a second member of the fastener of FIG. 1.
Figure 4:
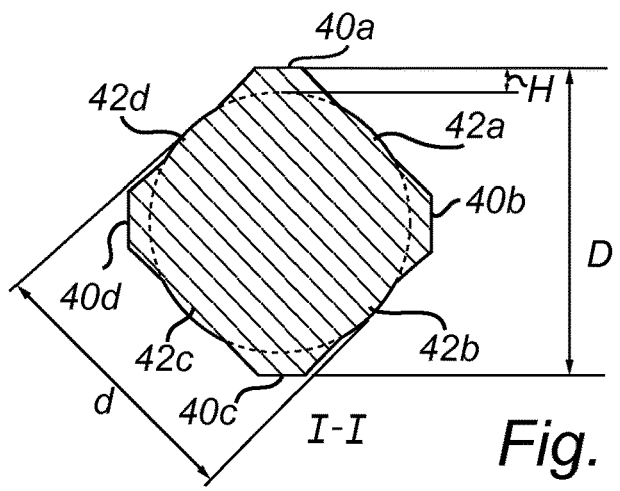
FIG. 4 is a cross-sectional view of the second member of FIG. 3.

The second member 14 of the fastener 10 is generally adapted to be press-fitted in a non-threaded bore. Turning to FIGS. 3 and 4, the second member 14 comprises a cylindrical outer surface with a plurality of longitudinally extending outer ridges 40a-d. The ridges 40a-d are situated in the direction of, or along, the longitudinal axis 16 of the fastener. The ridges 40a-d are parallel or substantially parallel to the longitudinal axis 16 of the fastener 10. The ridges 40a-d may extend for (substantially) the complete length L of the second member 14. Alternatively, the ridges may extend for only a portion of the length L of the second member 14. A (very short) (ring-shaped) portion 41 of the second member 14 next to the shank 20 of the first member 12 may be without ridges. The length L of the second member 14 may for example be 3.2 mm. Furthermore, the illustrated ridges 40a-d are straight. The number of ridges 40a-d in the illustrated embodiment is four, but the number of ridges could alternatively be fewer (e.g. two or three) or more (e.g. five or six).

The ridges 40a-d are separated by longitudinally unvarying surfaces 42a-d. The surfaces 42a-d may be portions or sections of the aforementioned cylindrical outer surface. 'Longitudinally unvarying' means that the surfaces 42a-d may be even or smooth throughout the length L of the second member 14, without any radially outwardly extending flanges or the like.

Each ridge 40a-d may have a trapezoid cross-section, as shown in FIG. 4. The cross-section is perpendicular to the longitudinal axis 16. Depending on the proportions of the second member 14, the trapezoid cross-section may result in an overall cross-section of the second member 14 which appears shaped like a square. Instead of trapezoid cross-sections, the ridges 40a-d can have other cross-sections, such as square or rectangular or convex cross-sections.

The maximum diameter D of the second member 14 may be equal to or less than the aforementioned maximum diameter of the shank 20 of the first member 12. The maximum diameter D may be in the range of 105-115% of the diameter of the non-threaded bore. The maximum diameter D of the second member 14 may for example be 4.7 mm or 4.85 mm. The minimum diameter of the second member is denoted d. The minimum diameter d may be in the range of 75-85% of the diameter of the non-threaded bore. The minimum diameter d may for example be 3.65 mm. The minimum diameter d of the second member 14 may e.g. be in the range of 65-85% or 70-80% of the maximum diameter D of the second member 14, to ensure or at least promote proper fit in the non-threaded bore. The minimum diameter d may for example be 75% of the maximum diameter D (e.g. 4.85 mm×0.75≈3.65 mm).

Each ridge 40a-d may have a uniform shape in the longitudinal direction. In particular, each longitudinal ridge 40a-d may extend uniformly along substantially the complete length L of the second member 14 as in the illustrated embodiment, meaning that both the height H and widths $W_1$ and $W_2$ of each ridge 40a-d may be constant throughout the length L of the second member 14, except the terminal ends 44 of each ridge 40a-d which may be chamfered. The terminal ends 44 may for example be chamfered about 45 deg.

The ridges 40a-d are evenly distributed about the circumference of the second member 14, as seen in particular in FIG. 4. Hence, the four ridges 40a-d are here located 90 deg. apart. The ridges 40a-d could alternatively be distributed in some other way, for example in pairs.

The second member 14 is at least partly deformable. To this end, the second member 14 can be made of plastics, such as Moplen EP548R. The deformation of the second member 14 may be elastic or plastic. The second member 14 can for example be made of a material having a tensile strength in the range of 20-40 MPa, to achieve appropriate deformation.

The second member 14 can be molded onto the projection 22 of the first member 12. The second member 14 hence has an inner recess matching the projection 22 of the first member 12. The anchor portion 36 of the projection 22 may ensure that the second member 14 does not it slip off the projection 22. Furthermore, the circular and chamfered end 24 of the shank 20 may beneficially be used as a sealing surface against a casting mold (not shown) during manufacturing of the fastener 10. During manufacturing, the casting mold may be sealed against the circular and chamfered end 24, whereafter mold material is injected into the casting mold to form the second member 14. Instead of being molded onto the first member 12, the second member 14 could for example be glued or snap-fitted to the first member 12.

Figure 5A:
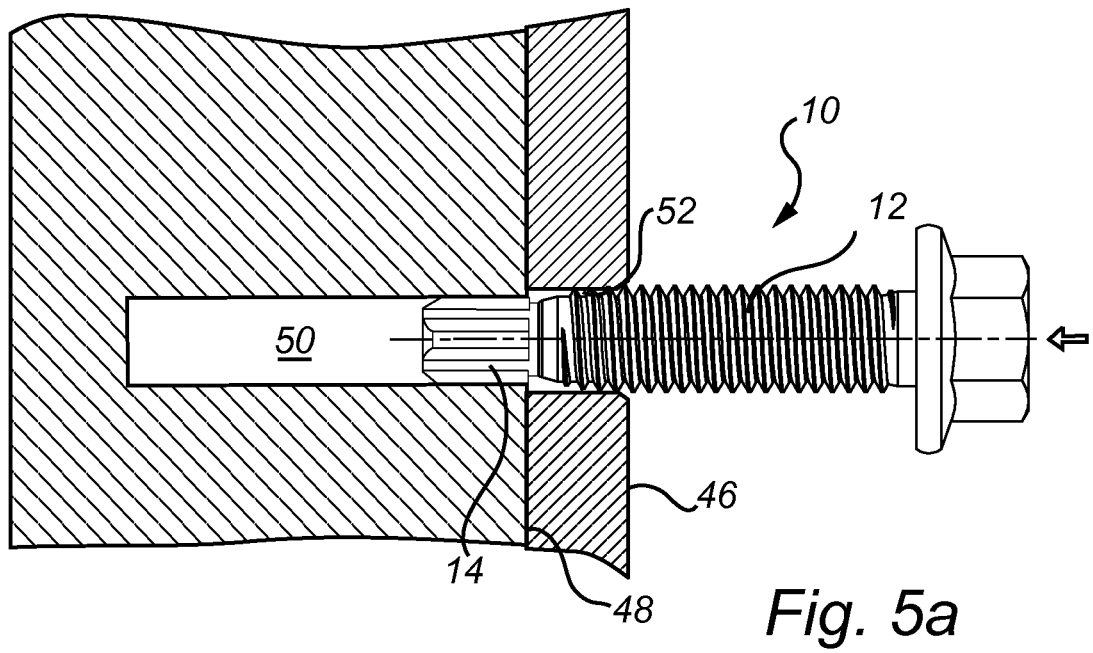
FIGS. 5a-b illustrate a method according to an embodiment of the present invention.
Figure 5B:
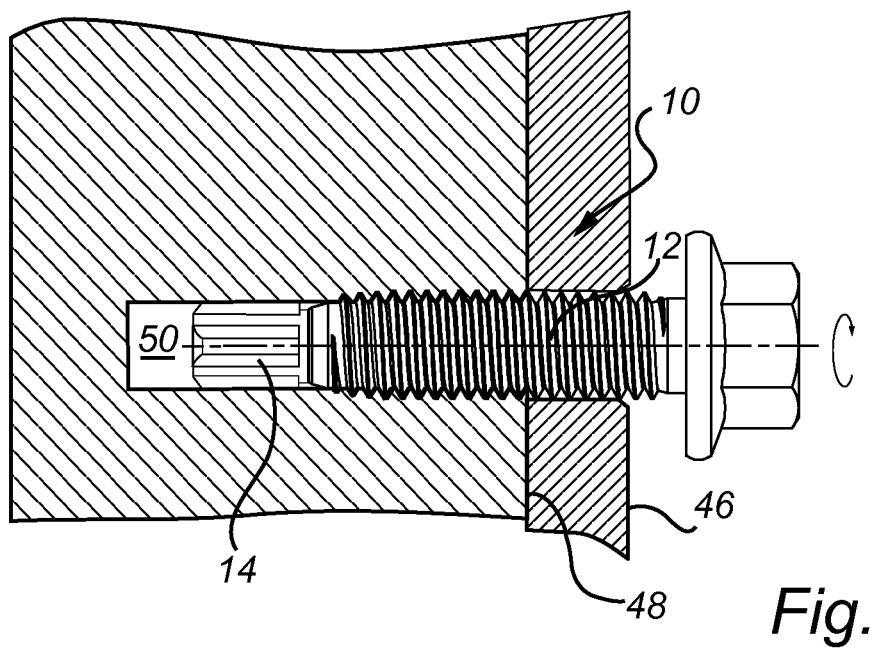
Figure 6:
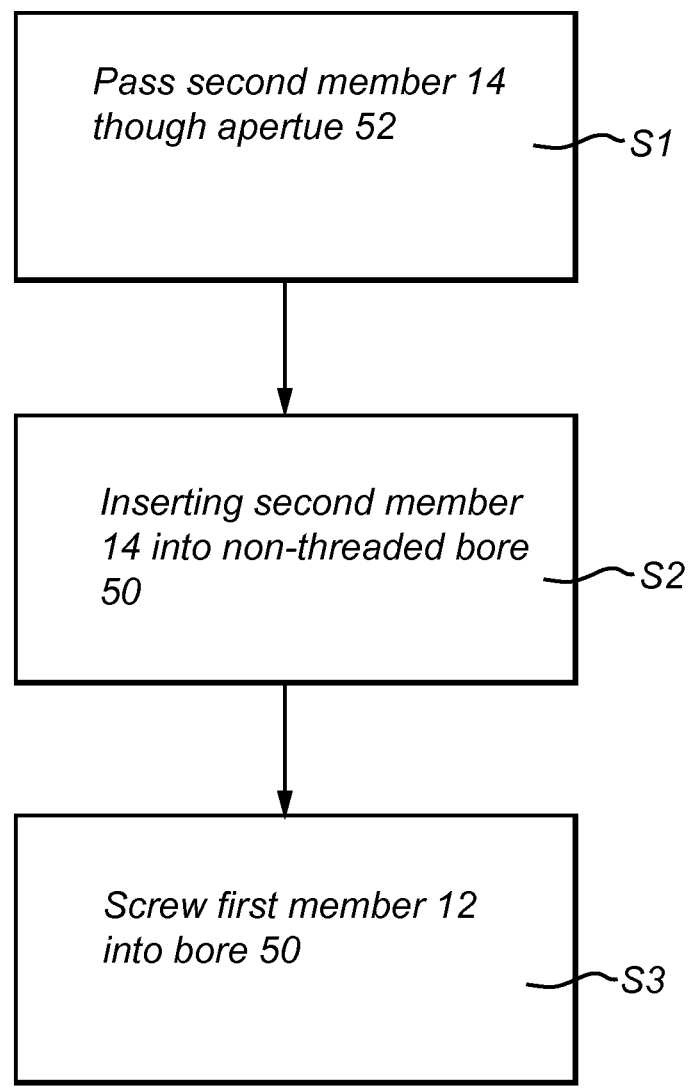
FIG. 6 is a flow-chart of the method of FIG. 5.
Figure 7:
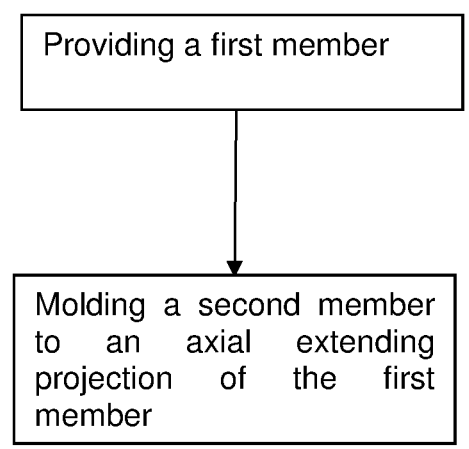
FIG. 7 is a flow-chart of a method of manufacturing a fastener.

With further reference to FIGS. 5a-b and 6, the fastener 10 may be used to mount a first object 46 to a second object 48, wherein the second object comprises a non-threaded bore 50. The bore 50 may be cylindrical. The diameter of the non-threaded bore 50 should be smaller than the maximum diameter D of the second member 14, but larger than the minimum diameter d of the second member 14. The diameter of the non-threaded bore 50 may for example be in the range 4.5-4.6 mm. The non-threaded bore 50 may be easier and/or more convenient to provide than a threaded bore.

In use, the fastener 10 is first moved axially so that the second member 14 of the fastener 12 passes through a mounting aperture 52 of the first object 46 (step S1) and so that the second member 14 further is inserted into the non-threaded bore 50 (step S2, see FIG. 5a) where the second member 14 becomes press-fitted (or force-fitted). The four ridges 40a-d of the second member 14 may provide for an appropriate contact surface with the non-threaded bore 50. The contact surface may be large enough for the second member 14 of the fastener 10 to be press-fitted in the non-threaded bore 50. At the same time, the contact surface may be small enough not to cause too much friction, whereby the second member 14 easily can be inserted into the non-threaded bore 50. Also, the surfaces 42a-d may be sufficiently wide to provide space for deformation of the ridges 40a-d. Also, the ridges 40a-d extending for substantially the complete length L of the second member 14 may ensure that the second member 14 is stably positioned in the bore 50. Furthermore, the chamfered terminal ends 44 may ensure that the second member 14 is easily inserted both in aperture 52 and bore 50. The uniform circumferential distribution of the ridges 40a-d may ensure that second member of the fastener 10 is evenly fitted in the bore 50. The operation S1-S2 could be done manually by an operator without the use of any specific tool and without having to rotate the fastener 10 about its longitudinal axis. The fastener 10 inserted this way may be sufficient to hold the first object 46 in place. Of course, additional fasteners 10/apertures 52/non-threaded bores 50 can be used to mount the first object 46 to the second object 48.

Next, further axial pressure may be applied so that the thread 32 of the shank 20 engages the non-threaded bore 50, whereafter the fastener 10 can be screwed into the bore 50 (step S3) using an appropriate tool, such as spanner. The fastener 10 is screwed in until the flange 27 abuts the first object 46. As it is screwed in, the self-tapping fastener 10 forms a thread in the bore 50. The self-tapping fastener 10 may also eliminate the need of any additional device for locking the fastener 10.

The first object 46 may for example be an airbag of the inflatable curtain type, and the second object 48 may be a vehicle such as a car. However, the fastener 10 could be used in various other applications, such as mounting of the roof handles in a vehicle. Basically the fastener 10 is useable in any situation where an operator may want hold the first object with one hand and "temporarily" secure it to the second object with one or more fasteners using his or hers other hand, whereafter the operator may let go of the first object and "permanently" secure it by screwing in the fastener(s) using a tool.

The person skilled in the art realizes that the present invention by no means is limited to the preferred embodiments described above. On the contrary, many modifications and variations are possible within the scope of the appended claims.

The invention claimed is:

1. A fastener for a non-threaded bore, which fastener comprises:
    a first member with a head, an externally threaded shank extending from the head, and an axially extending projection at the opposite end of the shank compared to the head; and
    a second at least partly deformable member attached to the axially extending projection, wherein the second member comprises a plurality of longitudinally extending outer ridges, wherein the longitudinally extending outer ridges are adjacent to and separated by longitudinally unvarying surfaces; and wherein each longitudinally extending outer ridge extends uniformly along substantially the complete length of the second member.

2. The fastener according to claim 1, wherein the longitudinally unvarying surfaces are without any radially outwardly extending flanges.

3. The fastener according to claim 1, wherein the second member comprises a cylindrical outer surface including said longitudinally extending outer ridges.

4. The fastener according to claim 1, wherein each longitudinally extending outer ridge has a trapezoid cross-section.

5. The fastener according to claim 1, wherein the longitudinally extending outer ridges are evenly distributed about the circumference of the second member.

6. The fastener according to claim 1, wherein the second member is molded onto the axially extending projection of the first member.

7. The fastener according to claim 1, wherein said opposite end of the shank of the first member is circular and chamfered.

8. The fastener according to claim 1, wherein first member is self-tapping.

9. The fastener according to claim 1, wherein the maximum diameter of the second member is equal to or less than the maximum diameter of the externally threaded shank of the first member.

10. The fastener according to claim 1, wherein the first member is made of metal or alloy, and wherein the second member is made of plastics.

11. A method of mounting a first object to a second object having a non-threaded bore using a fastener for a non-threaded bore, the fastener comprising:
    a first member with a head, an externally threaded shank extending from the head, and an axially extending projection at the opposite end of the shank compared to the head; and
    a second at least partly deformable member attached to the axially extending projection, wherein the second member comprises a plurality of longitudinally extending outer ridges, wherein the longitudinally extending outer ridges are adjacent to and separated by longitudinally unvarying surfaces,
    the method comprising:
    inserting the second member of the fastener into the non-threaded bore;
    subsequently screwing the first member of said fastener into the non-threaded bore; and
    before inserting the second member of the fastener into the non-threaded bore, passing the second member through an aperture of the first object.

12. A method of manufacturing a fastener, which method comprises:
    providing a first member of the fastener, the first member comprising a head, an externally threaded shank extending from the head, and an axially extending projection at the opposite end of the shank compared to the head; and
    molding a second member onto the axially extending projection of the first member, which second member is adapted to be press-fitted in a non-threaded bore, wherein the second member comprises a plurality of longitudinally extending outer ridges,
    wherein the longitudinally extending outer ridges are adjacent to and separated by longitudinally unvarying surfaces; and
    wherein each longitudinally extending outer ridge extends uniformly along substantially the complete length of the second member and/or wherein the maximum diameter of the second member is equal to or less than the maximum diameter of the externally threaded shank of the first member.

13. The method according to claim 12, wherein said opposite end of the shank of the first member is circular and chamfered, and wherein molding the second member onto the axially extending projection of the first member comprises:
    sealing a casting mold against the circular and chamfered opposite end of the shank of the first member; and
    injecting mold material into the casting mold to form the second member of the fastener.

14. A fastener for a non-threaded bore, which fastener comprises:
    a first member with a head, an externally threaded shank extending from the head, and an axially extending projection at the opposite end of the shank compared to the head; and
    a second at least partly deformable member attached to the axially extending projection, wherein the second member comprises a plurality of longitudinally extending outer ridges, wherein the longitudinally extending outer ridges are adjacent to and separated by longitudinally unvarying surfaces; wherein the maximum diameter of the second member is equal to or less than the maximum diameter of the externally threaded shank of the first member.

15. The fastener according to claim 14, wherein the longitudinally unvarying surfaces are without any radially outwardly extending flanges.

16. The fastener according to claim 14, wherein the second member comprises a cylindrical outer surface including said longitudinally extending outer ridges.

17. The fastener according to claim 14, wherein each longitudinally extending outer ridge has a trapezoid cross-section.

18. The fastener according to claim 14, wherein each longitudinally extending outer ridge extends uniformly along substantially the complete length of the second member.

19. The fastener according to claim 14, wherein the longitudinally extending outer ridges are evenly distributed about the circumference of the second member.

20. The fastener according to claim 14, wherein the second member is molded onto the axially extending projection of the first member.

21. The fastener according to claim 14, wherein said opposite end of the shank of the first member is circular and chamfered.

22. The fastener according to claim 14, wherein first member is self-tapping.

23. The fastener according to claim 14, wherein the first member is made of metal or alloy, and wherein the second member is made of plastics.

* * * * *